(12) United States Patent
Salter et al.

(10) Patent No.: US 11,685,315 B2
(45) Date of Patent: Jun. 27, 2023

(54) VEHICLE HAVING SLIDING DRAWER POSITIONABLE BETWEEN COMPARTMENTS

(71) Applicant: Ford Global Technologies, LLC, Dearborn, MI (US)

(72) Inventors: Stuart C. Salter, White Lake, MI (US); Aaron Gould, Detroit, MI (US); David Brian Glickman, Southfield, MI (US); Paul Kenneth Dellock, Northville, MI (US); Katherine Howard-Cone, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 17/195,932

(22) Filed: Mar. 9, 2021

(65) Prior Publication Data

US 2022/0289113 A1    Sep. 15, 2022

(51) Int. Cl.
  *B60R 7/04* (2006.01)
  *B60R 25/23* (2013.01)
  *B60R 25/01* (2013.01)
  *H04N 7/18* (2006.01)

(52) U.S. Cl.
  CPC .............. *B60R 7/04* (2013.01); *B60R 25/01* (2013.01); *B60R 25/23* (2013.01); *H04N 7/18* (2013.01)

(58) Field of Classification Search
  CPC .......... B60R 7/04; B60R 25/01; B60R 25/23; B60R 5/02
  USPC .......................... 296/37.1, 37.12, 24.34, 37.8
  See application file for complete search history.

(56) References Cited

U.S. PATENT DOCUMENTS

| | | | |
|---|---|---|---|
| 6,474,715 B2 | 11/2002 | Fukushima et al. | |
| 7,591,498 B2 | 9/2009 | Busha et al. | |
| 8,444,198 B2 * | 5/2013 | Pauken | B60R 7/02 224/311 |
| 10,633,033 B1 | 4/2020 | Salter et al. | |
| 10,676,137 B2 | 6/2020 | Bollinger | |
| 10,730,400 B2 * | 8/2020 | Salter | B60L 53/18 |
| 11,345,285 B2 * | 5/2022 | Joshi | B60R 9/065 |
| 2007/0187969 A1 | 8/2007 | Dowd et al. | |
| 2019/0118692 A1 * | 4/2019 | Qiu | B60L 50/50 |
| 2020/0193368 A1 * | 6/2020 | Bhatia | B60R 25/25 |

* cited by examiner

*Primary Examiner* — Amy R Weisberg
*Assistant Examiner* — E Turner Hicks
(74) *Attorney, Agent, or Firm* — Vichit Chea; Price Heneveld LLP (57) ABSTRACT

A vehicle including a passenger compartment is configured with one or more seats, a storage compartment separated from the passenger compartment by way of at least one wall, a housing extending through the at least one wall, and a drawer slidably positioned within the housing and movable between a first position accessible from within the passenger compartment and a second position accessible from the storage compartment.

18 Claims, 7 Drawing Sheets

VEHICLE HAVING SLIDING DRAWER POSITIONABLE BETWEEN COMPARTMENTS

FIELD OF THE DISCLOSURE

The present disclosure generally relates to motor vehicle storage compartments, and more particularly relates to a drawer that may be accessed from multiple compartments in a vehicle.

BACKGROUND OF THE DISCLOSURE

Motor vehicles are typically equipped with multiple compartments such as a passenger compartment, an engine compartment and one or more cargo storage compartments. For example, many vehicles are equipped with a central passenger compartment and a front compartment that typically contains the motor. For electric vehicles, the front compartment may also be used to store cargo due to the reduced consumption of space with the electric motor. It would be desirable to provide for a vehicle that enables items be accessed via multiple compartments.

SUMMARY OF THE DISCLOSURE

According to a first aspect of the present disclosure, a vehicle is provided that includes a passenger compartment configured with one or more seats, a storage compartment separated from the passenger compartment by way of at least one wall, a housing extending through the at least one wall, and a drawer slidably positioned within the housing and movable between a first position accessible from within the passenger compartment and a second position accessible from the storage compartment.

Embodiments of the first aspect of the disclosure can include any one or a combination of the following features:
- the storage compartment comprises is a front trunk of the vehicle;
- the front trunk comprises a hood panel configured to close the front trunk and to open to allow access to the front trunk;
- the first trunk comprises a motor for powering the vehicle;
- a center console extending between a driver and passenger seat, wherein the housing extends generally forward of the center console to enable the drawer to slide to the first position above a portion of the center console;
- a transmission shifter operable to move between a use position and a stowed position that is lower than the use position, wherein the drawer may extend over the transmission shifter in the first position;
- a track disposed within the housing and operatively coupled to the drawer to enable the drawer to slide on the track between the first and second positions;
- an actuator for actuating the drawer between the first and second positions;
- a locking mechanism for accessing the drawer;
- the locking mechanism comprises a keypad; and
- an imaging device for monitoring content within the drawer.

According to a second aspect of the present disclosure, a vehicle is provided that includes a passenger compartment configured with one or more seats, a front trunk separated from the passenger compartment by way of at least one wall and having a hood panel configured to close the front trunk and to open to allow access to the front trunk, a housing extending through the at least one wall, and a drawer slidably positioned within the housing and movable between a first position accessible from within the passenger compartment and a second position accessible from the front trunk.

Embodiments of the second aspect of the disclosure can include any one or a combination of the following features:
- the front trunk of the vehicle contains an electric motor;
- a center console extending between a driver and passenger seat, wherein the housing extends generally forward of the center console to enable the drawer to slide to the first position above a portion of the center console;
- a transmission shifter operable to move between a use position and a stowed position that is lower than the use position, wherein the drawer may extend over the transmission shifter in the first position;
- a track disposed within the housing and operatively coupled to the drawer to enable the drawer to slide on the track between the first and second positions;
- an actuator for actuating the drawer between the first and second positions;
- a locking mechanism for accessing the drawer;
- the locking mechanism comprises a keypad; and
- an imaging device for monitoring content within the drawer.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
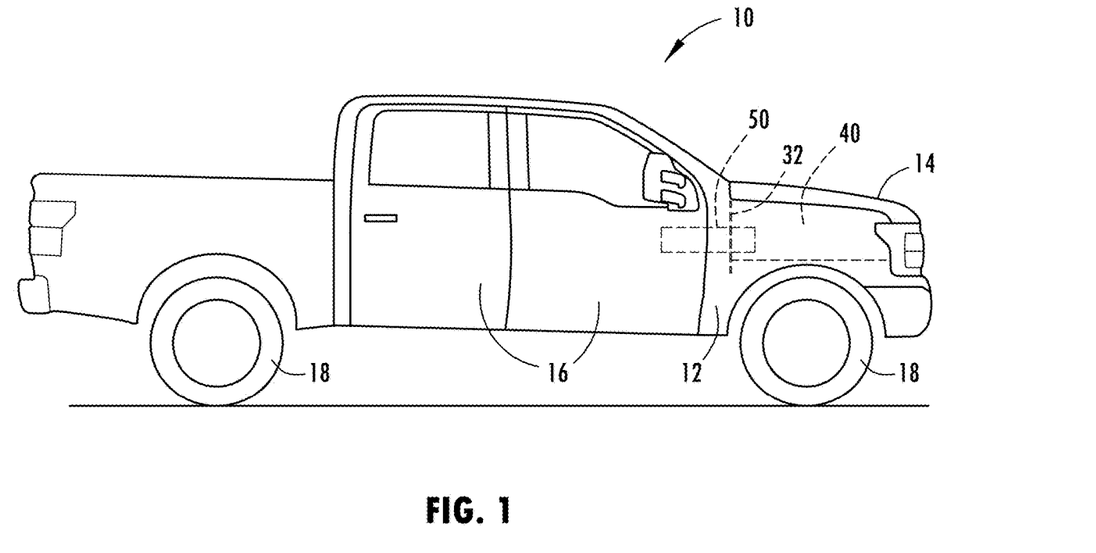
FIG. 1 is side view of a motor vehicle having a sliding storage drawer accessible via multiple compartments, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a sliding storage drawer. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
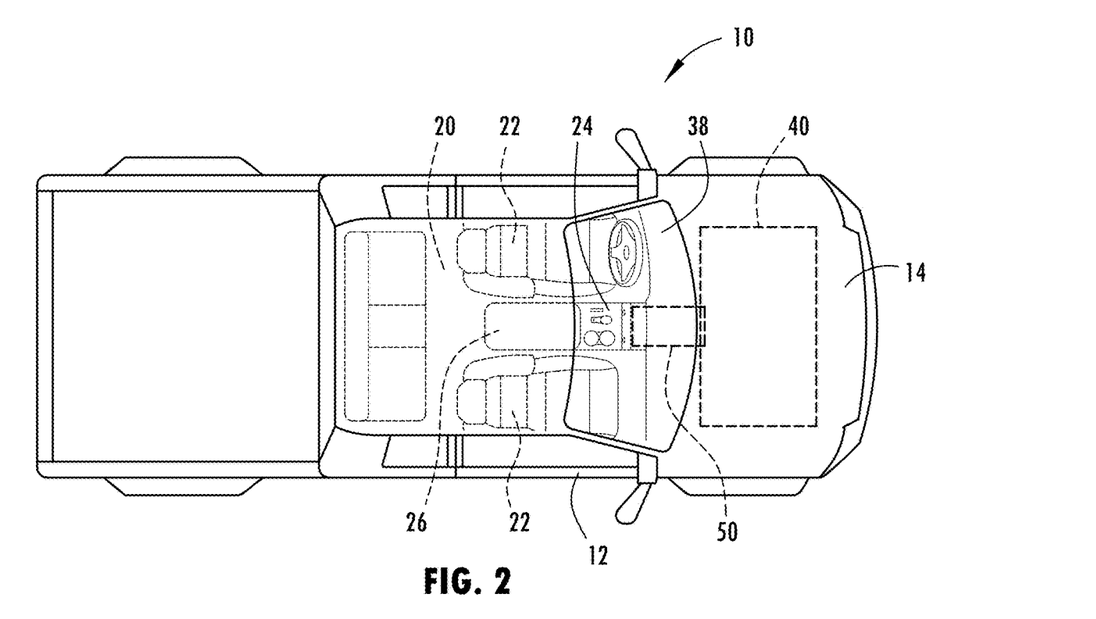
FIG. 2 is a top view of the vehicle further illustrating the sliding storage drawer located between a passenger compartment and a front storage compartment.

Referring to FIGS. 1 and 2, a wheeled motor vehicle 10 is generally illustrated configured with passenger seating for transporting one or more passengers and cargo. The vehicle 10 includes a vehicle body 12, a powertrain including a motor, and a plurality of road wheels 18. The vehicle 10 is generally illustrated as a pickup truck, however, the vehicle 10 may be configured as a wheeled car, truck, SUV, van or bus, for example or other vehicle having multiple compartments.

The vehicle body 12 generally includes a plurality of doors 16, a front windshield 38, and other body panels that generally define a passenger compartment 20 and a front storage compartment. The vehicle 10 has a hood panel 14 that covers the front storage compartment 40 at the front side of the vehicle 10 forward of the passenger compartment 20. The front storage compartment 40 may be accessed from the top side by opening the hood panel 14 which may pivot about hinges on a rear edge. The front storage compartment 40 may house an electric motor for an electric vehicle, according to one example. The storage compartment 40 may be referred to as an engine compartment or a front or frunk trunk.

Included within the passenger compartment 20 are a plurality of seats 22. Two front row seats 22 are generally illustrated separated by a center console 24. The rear end of the center console 24 has a rear lid 26 that may function as an armrest. The center console 24 generally extends forward to a dashboard panel. It should be appreciated that other seating arrangements may be provided.

Figure 3:
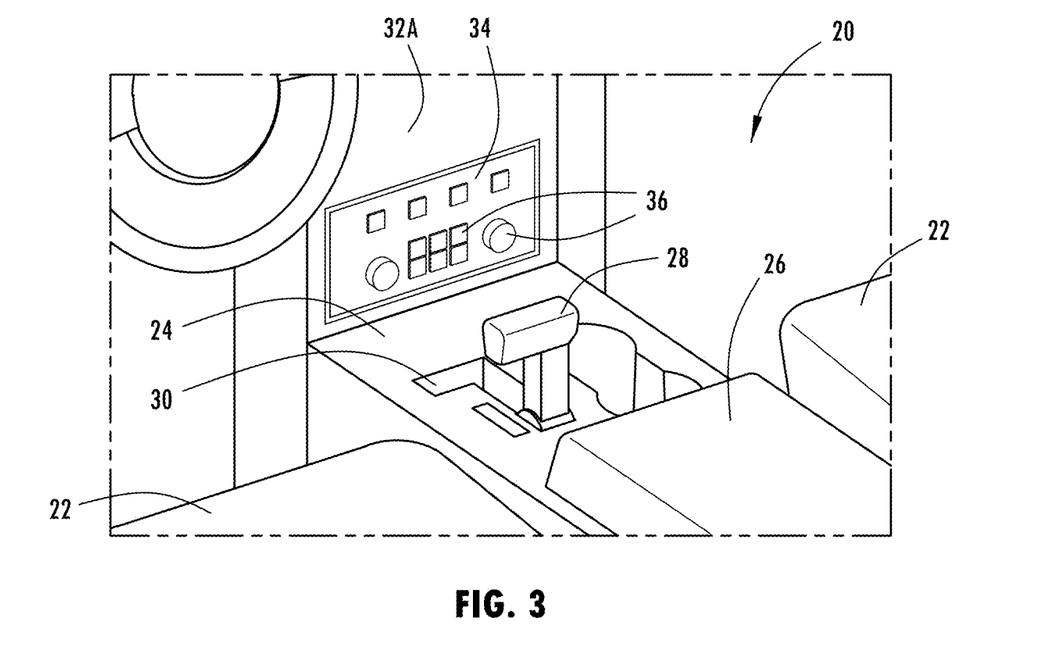
FIG. 3 is an enlarged perspective view of a front side of the passenger compartment with a panel in a closed position covering a housing and the storage drawer.
Figure 4:
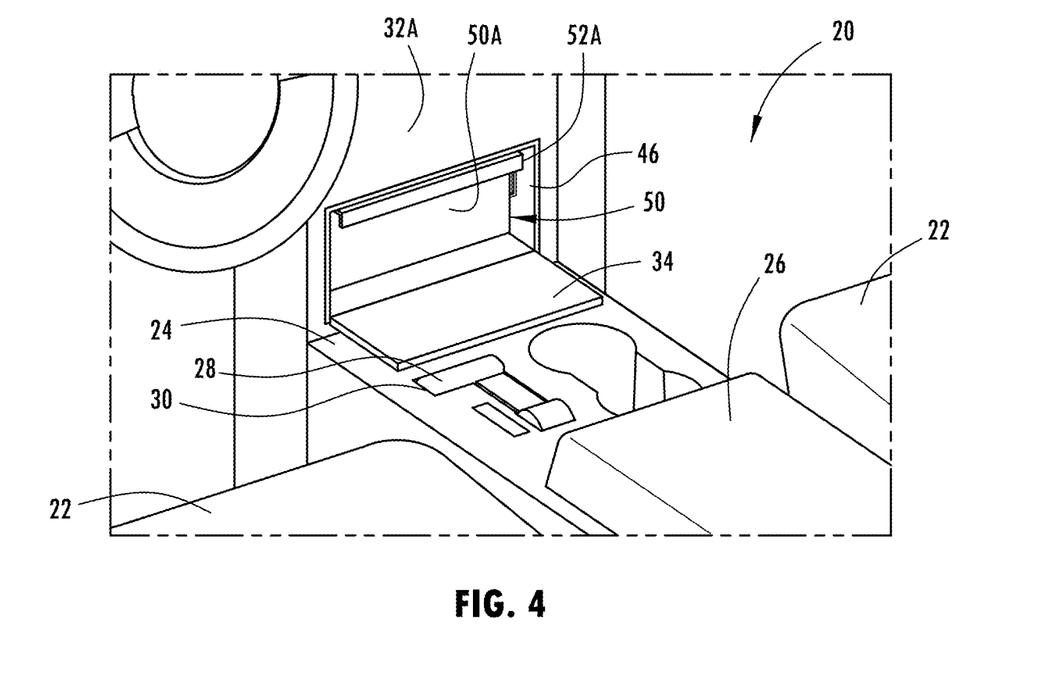
FIG. 4 is a perspective view of the front side of the passenger compartment with the panel in an open position exposing the housing and storage drawer.
Figure 5:
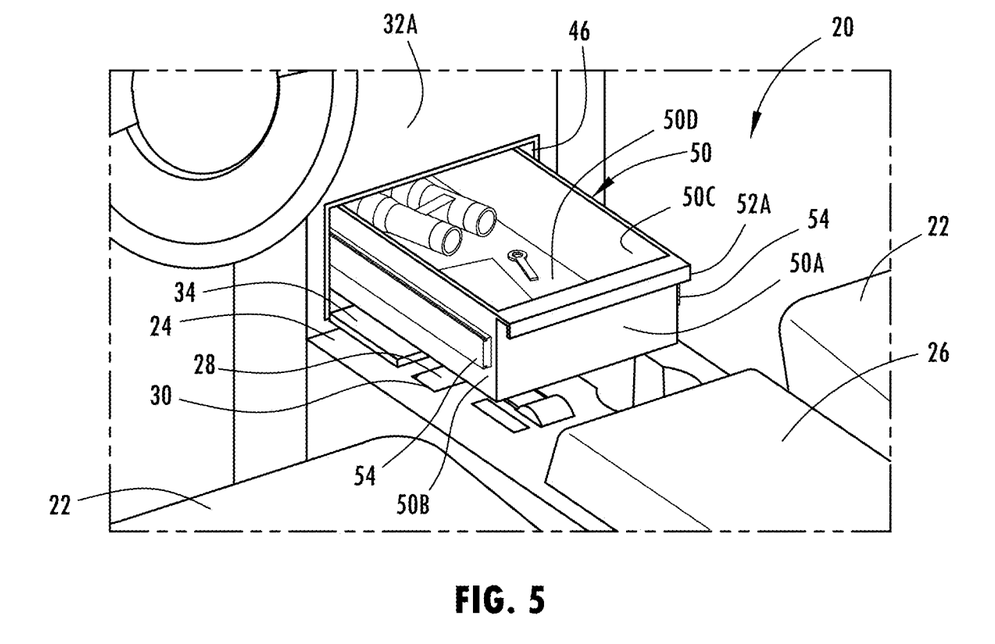
FIG. 5 is a perspective view of the front side of the passenger compartment with the storage drawer pulled out of the housing in the first position.

Also positioned within the center console 24 is a transmission gear shifter 28 shown in FIG. 3 having a generally L-shaped lever that may be actuated to one of a plurality of transmission positions PRNDL when in the upright use position. The transmission shifter 28 may be actuated to pivot downward into a slot 30 in the center console to a stored position as shown in FIG. 4. When the transmission shifter 28 is in the stored position, a forward portion of the center console 24 has a generally conformable upper flat surface that is lower than the rear lid 26.

Figure 6:
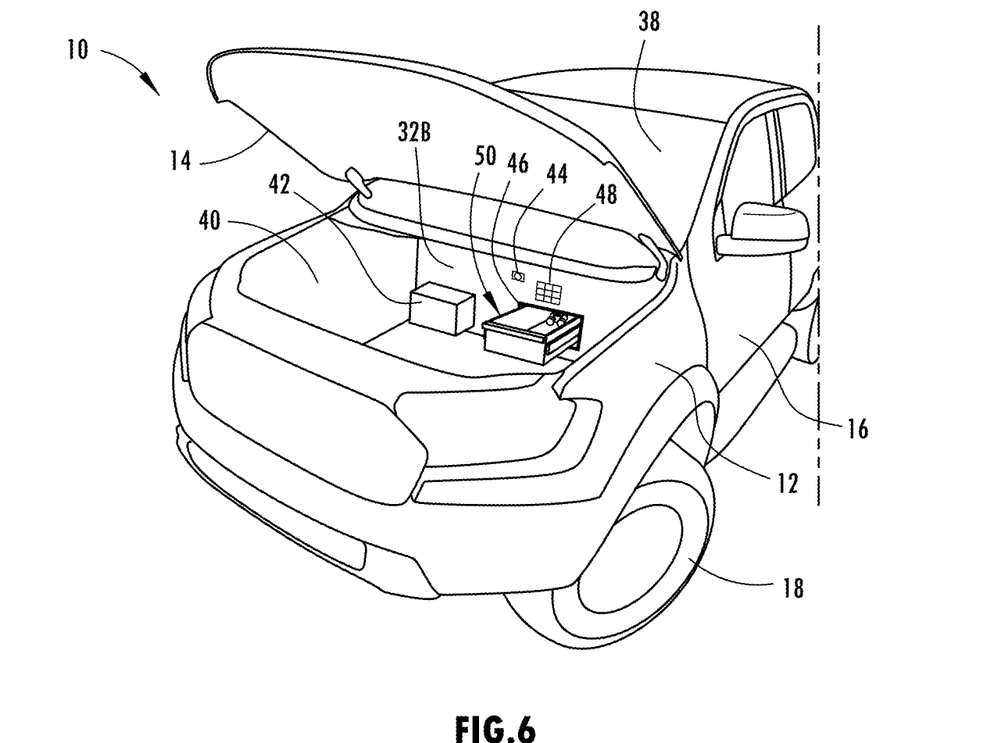
FIG. 6 is a front perspective view of the vehicle illustrating the hood panel in an open position exposing a front storage compartment and with the storage drawer in a second position.
Figure 7:
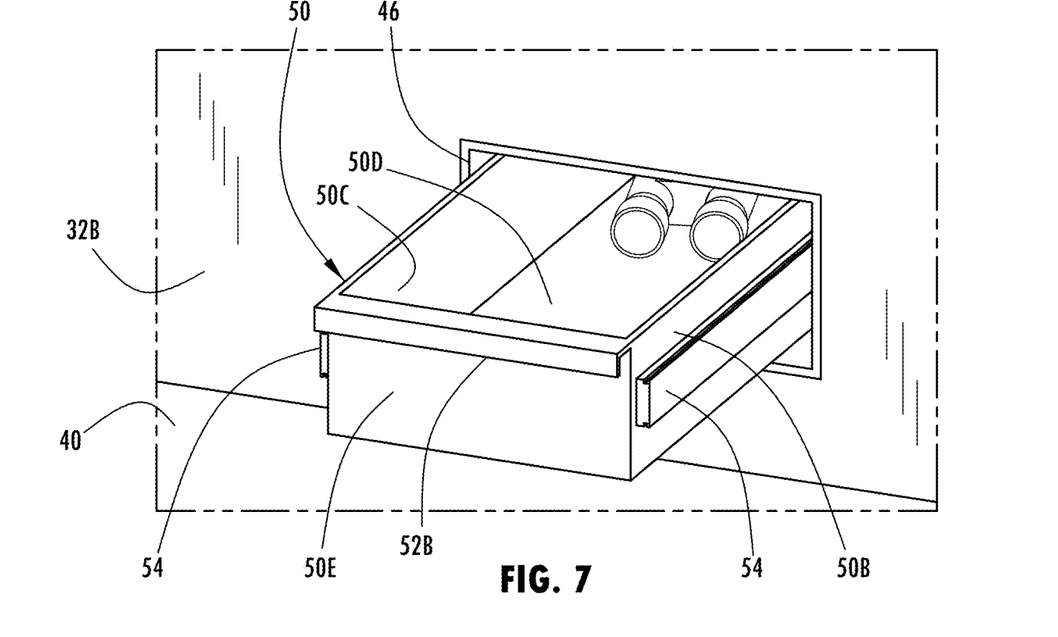
FIG. 7 is an enlarged view of the storage drawer within the storage compartment in the second position.

The passenger compartment 20 and the front storage compartment 40 are generally separated by one or more walls 32. The one or more walls 32 may include a first wall 32A at the front of the passenger compartment 20 which may be referred to as the dashboard panel and a second wall 32B at the rear side of the front storage compartment 40 as seen in FIG. 6. The second wall 32B is spaced from the first wall 32A.

The vehicle 10 has a rectangular housing 46 extending through the at least one wall 32 including through the first wall 32A and the second wall 32B to define a slot for receiving a sliding storage drawer 50. The housing 46 has an opening at the rear end in the front wall 32A that is covered with a panel 34 when the panel 34 is in the normally closed position. Panel 34 may include a climate control head panel having climate control inputs 36. Panel 34 may pivot about the lower edge downward to an open position to expose the opening at the rear end of the housing 46 to allow access to the storage drawer 50. The housing 32 is generally located forward of and above the forward portion of the center console 24.

An imaging device 44, such as a camera, may be located in the front storage compartment 40 and oriented to capture images of the space in the storage drawer 50 as shown in FIG. 6. As such, items stored in the storage drawer 50 may be captured in images which may be displayed on a display.

A keypad 48 or other locking or latching device may be located in the front storage compartment 40 to control access to the storage drawer 50. A user may unlock to open the drawer 50 from within the front storage compartment 40 by entering a code sequence on a touch pad. It should be appreciated that other locking devices may be employed.

Figure 8A:
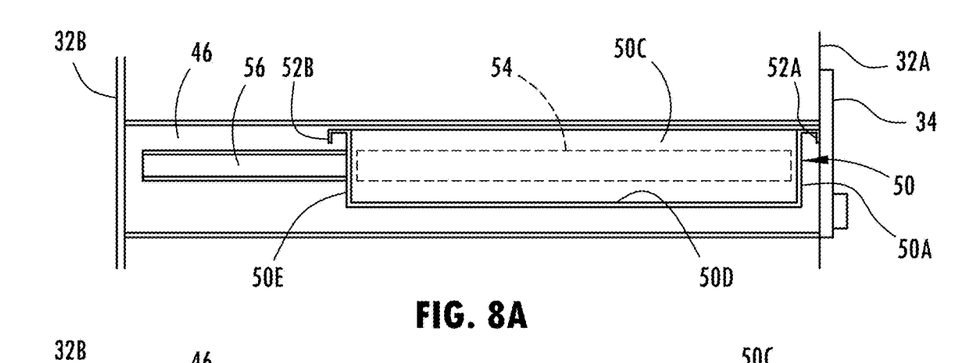
FIG. 8A is a schematic side view of the storage drawer in an intermediate position fully contained within the housing.
Figures 8B, 8C:
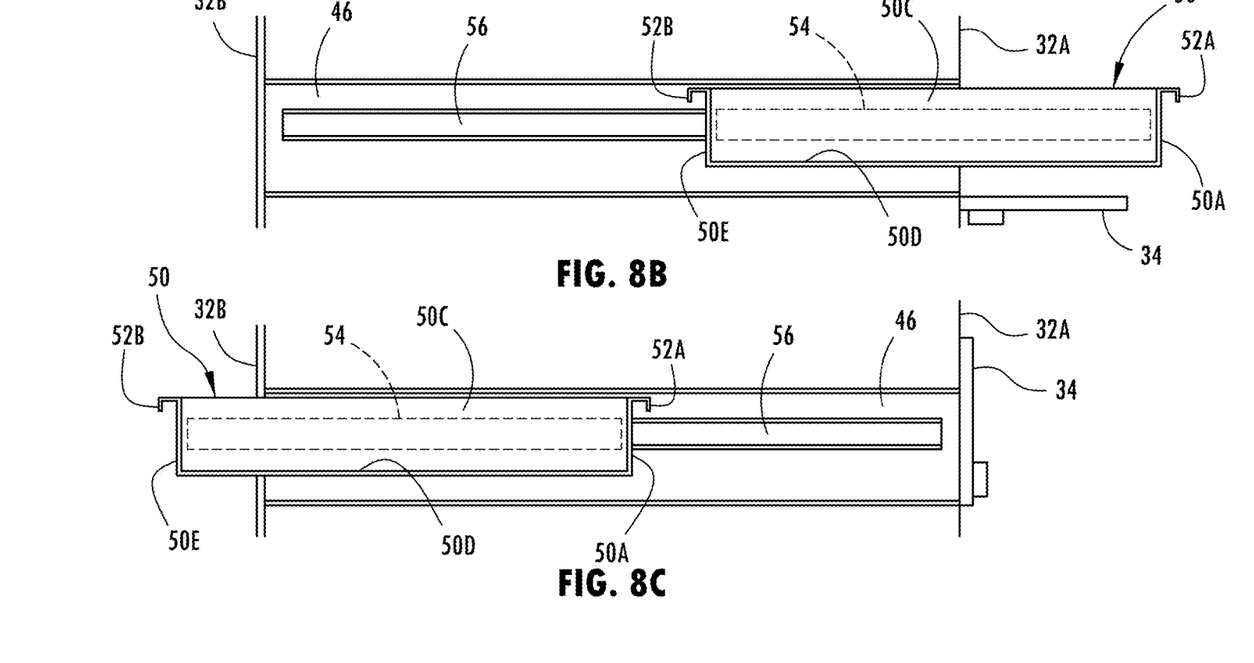
FIG. 8B is a schematic side view of the storage drawer shown in a first position accessible within the passenger compartment.
FIG. 8C is a schematic side view of the storage drawer shown in a second position accessible from the front storage compartment.

The sliding storage drawer 50 is slidably positioned within the housing 46 and is movable between a rearward first position accessible from within the passenger compartment 20 and a forward second position accessible from within the front storage compartment 40. In one embodiment, the sliding storage drawer 50 is manually actuatable by a user pulling or pushing on the storage drawer 50 from the front side or the rear side. The storage drawer 50 includes a rear wall 50A, two lateral side walls 50B and 50C, a bottom wall 50D and a front wall 50E. In addition, the drawer 50 includes a front handle 52A proximate the rear wall 50A and a rear handle 52B proximate the front wall 50E. The storage drawer 50 may include slides 54 mounted on the outer surface of the opposite lateral side walls 50B and 50C that engage a corresponding pair of tracks 56 provided on opposite lateral walls of the housing as seen in FIGS. 8A-8C. The slides 54 may slide on tracks 56 and may include ball bearing slides that slide within a telescoping track, according to one example.

With panel 34 in a closed position as seen in FIG. 8A, the housing and storage drawer 54 are hidden from sight to a viewer seated within the passenger compartment 20. In order to access the storage drawer 54 from within the passenger compartment 20, a passenger may pivot the panel 34 downward to the open position and may pull rearward on rear handle 52B to slide the storage drawer 50 rearward along the tracks 56 to the first position such that the space within the storage drawer 50 is accessible as shown in FIG. 8B. The drawer 50 may also be accessed within the front storage compartment 40 as seen in FIG. 8C. To do so, a user may pull forward on front handle 52A to slide the storage drawer 50 forward to the second position where the space within the storage drawer 50 is accessible from within the front storage compartment 40. With the storage drawer 50 in an intermediate position between the first and second positions, the storage drawer 50 may be contained within the housing 46, in which case the storage drawer 50 is not accessible.

While the sliding storage drawer 50 is shown manually actuatable by a user, according to the one embodiment, it should be appreciated that the storage drawer 50 may be actuated via an actuator, such as a motor, according to other embodiments. For example, a screw-driven motorized linear guide may be mounted to the bottom wall of the storage drawer 50 or to one or more of the side walls of the storage drawer 50 and powered to actuate the storage drawer 50 between the first and second positions. The screw-driven motorized linear guide may be integrated into the slide and track configuration as shown in the manually actuated embodiment.

Figure 9A:
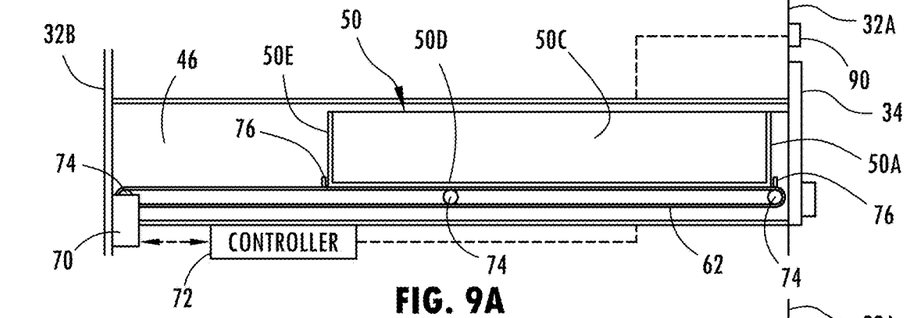
FIG. 9A is a schematic side view of the storage drawer contained within the housing and having a motor for actuating the drawer according to another embodiment.
Figure 9B:
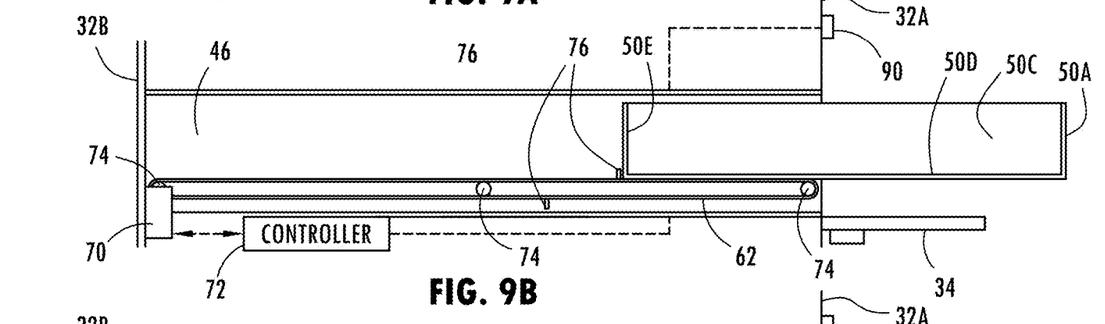
FIG. 9B is a schematic side view of the storage drawer shown actuated by the motor into the first position.
Figure 9C:
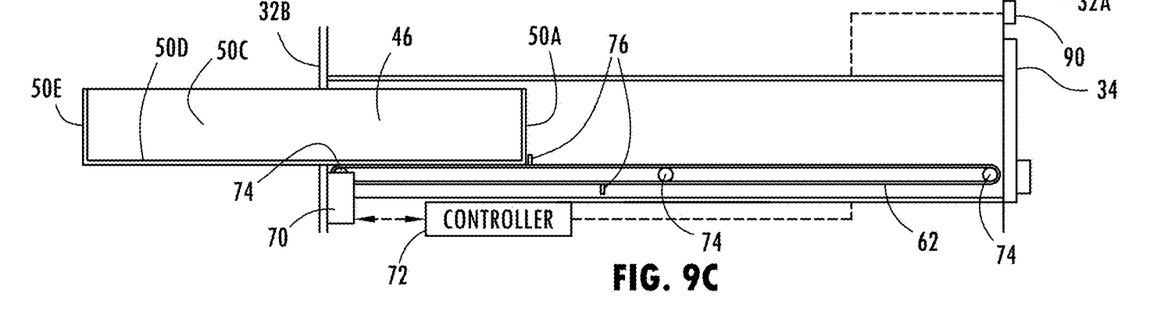
FIG. 9C is a schematic side view of the storage drawer shown actuated by the motor into a second position.

Referring to FIGS. 9A-9C, the storage drawer 50 is shown having an actuator, according to another embodiment. In this embodiment, the storage drawer 50 is supported on top of a motorized actuator 60 having a belt 62 that is actuated via a motor 70 to rotate about rollers 74 in either a clockwise or counterclockwise direction. The belt 62 further is illustrated containing a plurality of stop mechanisms shown in the form as paddles 76 that extend upright to engage the storage drawer 50 to prevent sliding of the storage drawer 50 relative to the belt 62. The motor 70 may rotate the belt 62 between the first position shown in FIG. 9B and the second position shown in FIG. 9C and an intermediate position therebetween as shown in FIG. 9A. The electric motor 70 may be controlled via a controller 72 which may include a microprocessor or other control circuitry. A user input 90, such as a pushbutton shown located above panel 34, may be depressed by a user to instruct the controller 72 to activate the motor 70 to move the storage drawer 50 to a desired position.

Figure 10:
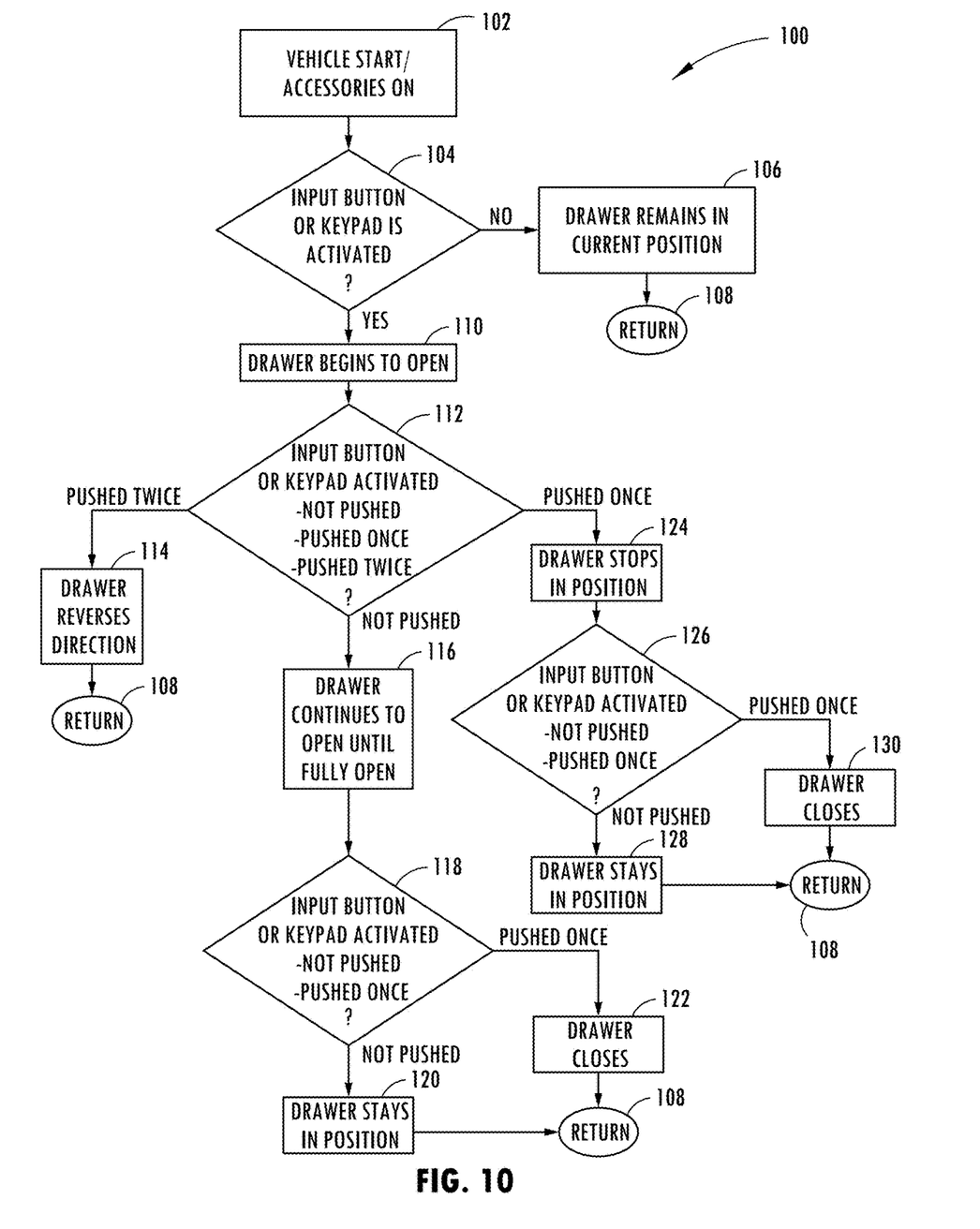
FIG. 10 is a flow diagram illustrating a control routine for controlling movement of the storage drawer, according to one embodiment.

Movement of the sliding storage door 50 to the various positions with an actuator may be controlled according to a control routine executed by the controller as shown in FIG. 10. The control routine 100 begins at step 102 when the vehicle accessories are turned on, i.e., powered. Routine 100 proceeds to decision step 104 to determine if the input button or keypad is activated and, if not, proceeds to step 106 to keep the drawer in the current position before returning at step 108. If the input button or keypad is activated, routine 100 proceeds to step 110 to begin to open the drawer with the actuator. This may be achieved by a controller controlling a motor to actuate the storage drawer towards an open position which may be the first position accessible from the passenger compartment or the second position accessible via the front storage compartment.

At decision step 112, routine 100 determines whether or not the input button is not pushed, is pushed once or is pushed twice. If the open button is pushed twice, the drawer is controlled to reverse direction at step 114 before returning at step 108. If the open button is not pushed, the storage drawer continues to open until it is fully open in either the first or second position. With the storage drawer in the fully open position, routine 100 proceeds to step 118 to determine if the input button has not been pushed or has been pushed once. If the input button has not been pushed, the drawer stays in that current position. If the input button has been pushed once, the storage drawer closes at step 122 before returning at step 108.

Returning to decision step 112, if the input button is pushed once, routine 100 proceeds to step 124 to stop the storage drawer in that current position. Next, at decision step 126, routine 100 determines if the input button has not been pushed or has been pushed once. If the input button has not been pushed, the storage drawer stays in that position at step 128 before returning at step 108. If the input button has been pushed once, the storage drawer closes at step 130, and then routine 100 returns at step 108.

Accordingly, the sliding storage drawer 50 is movable within a housing to be easily accessible in a first position from within the passenger compartment 20 of the vehicle 10 and is also easily accessible in a second position from within the front storage compartment 40. The sliding storage drawer 50 allows for the storage of items, such as personal belongings that may be stored out of sight and accessed from within the vehicle 10 or from outside the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a passenger compartment configured with one or more seats;
   a storage compartment separated from the passenger compartment by way of at least one wall;
   a housing extending through the at least one wall;
   a drawer slidably positioned within the housing and movable between a first position accessible from within the passenger compartment and a second position accessible from the storage compartment, and
   a center console extending between a driver and passenger seat, wherein the housing extends generally forward of the center console to enable the drawer to slide to the first position above a portion of the center console.

2. The vehicle of claim 1, wherein the storage compartment comprises a front trunk of the vehicle.

3. The vehicle of claim 2, wherein the front trunk comprises a hood panel configured to close the front trunk and to open to allow access to the front trunk.

4. The vehicle of claim 3, wherein the front trunk comprises a motor.

5. The vehicle of claim 1, further comprising a transmission shifter operable to move between a use position and a stowed position that is lower than the use position, wherein the drawer may extend over the transmission shifter in the first position.

6. The vehicle of claim 1, further comprising a track disposed within the housing and operatively coupled to the drawer to enable the drawer to slide on the track between the first and second positions.

7. The vehicle of claim 5, further comprising an actuator for actuating the drawer between the first and second positions.

8. The vehicle of claim 1, further comprising a locking mechanism for accessing the drawer.

9. The vehicle of claim 8, wherein the locking mechanism comprises a keypad.

10. The vehicle of claim 1, further comprising an imaging device for monitoring content within the drawer.

11. A vehicle comprising:
    a passenger compartment configured with one or more seats;
    a front trunk separated from the passenger compartment by way of at least one wall and having a hood panel configured to close the front trunk and to open to allow access to the front trunk;
    a housing extending through the at least one wall;
    a drawer slidably positioned within the housing and movable between a first position accessible from within the passenger compartment and a second position accessible from the front trunk, and
    a center console extending between a driver and passenger seat, wherein the housing extends generally forward of the center console to enable the drawer to slide to the first position above a portion of the center console.

12. The vehicle of claim 11, wherein the front trunk of the vehicle contains an electric motor.

13. The vehicle of claim 11, further comprising a transmission shifter operable to move between a use position and a stowed position that is lower than the use position, wherein the drawer may extend over the transmission shifter in the first position.

14. The vehicle of claim 11, further comprising a track disposed within the housing and operatively coupled to the drawer to enable the drawer to slide on the track between the first and second positions.

15. The vehicle of claim 14, further comprising an actuator for actuating the drawer between the first and second positions.

16. The vehicle of claim 11, further comprising a locking mechanism for accessing the drawer.

17. The vehicle of claim 16, wherein the locking mechanism comprises a keypad.

18. The vehicle of claim 11, further comprising an imaging device for monitoring content within the drawer.

* * * * *